United States Patent
Fan et al.

(10) Patent No.: US 12,095,640 B2
(45) Date of Patent: Sep. 17, 2024

(54) NETWORK DATA ANALYTICS FUNCTIONALITY ENHANCEMENT AND NEW SERVICE CONSUMERS

(71) Applicant: NEC CORPORATION, Tokyo (JP)

(72) Inventors: Linghang Fan, Heidelberg (DE); Hassan Al-Kanani, Heidelberg (DE); Iskren Ianev, Heidelberg (DE); Sivasubramaniam Ramanan, Heidelberg (DE)

(73) Assignee: NEC CORPORATION, Tokyo (JP)

(*) Notice: Subject to any disclaimer, the term of this patent is extended or adjusted under 35 U.S.C. 154(b) by 309 days.

(21) Appl. No.: 16/970,196

(22) PCT Filed: Feb. 19, 2019

(86) PCT No.: PCT/EP2019/054102
§ 371 (c)(1),
(2) Date: Aug. 14, 2020

(87) PCT Pub. No.: WO2019/158777
PCT Pub. Date: Aug. 22, 2019

(65) Prior Publication Data
US 2021/0083956 A1    Mar. 18, 2021

(30) Foreign Application Priority Data
Feb. 19, 2018   (EP) .................................... 18157508

(51) Int. Cl.
*H04L 43/0876*   (2022.01)
*H04W 24/08*   (2009.01)

(52) U.S. Cl.
CPC ......... *H04L 43/0876* (2013.01); *H04W 24/08* (2013.01)

(58) Field of Classification Search
CPC .......................... H04L 43/0876; H04W 24/08
See application file for complete search history.

(56) References Cited

U.S. PATENT DOCUMENTS

| 2018/0027521 A1* | 1/2018 | Kim | ..................... H04W 68/02 455/458 |
| 2018/0262924 A1* | 9/2018 | Dao | ..................... H04W 24/02 |

FOREIGN PATENT DOCUMENTS

| WO | WO-2018111030 A1 * | 6/2018 | ............ H04W 36/28 |
| WO | WO-2019101340 A1 * | 5/2019 | ............ H04L 67/02 |
| WO | WO-2019138883 A1 * | 7/2019 | ............ H04W 48/16 |

OTHER PUBLICATIONS

"3rd Generation Partnership Project; Technical Specification Group Services and System Aspects; Policy and Charging Control Framework for the 5G System; Stage 2 (Release 15)", 3GPP TS 23.503 V15.0.0, Dec. 2017, 56 pages.

(Continued)

*Primary Examiner* — Ayanah S George
(74) *Attorney, Agent, or Firm* — Sughrue Mion, PLLC

(57) ABSTRACT

A Network Data Analytics Function (NWDAF) for 5G networks is disclosed. A higher granularity of the load level information from the NWDAF is proposed. Also proposed are new ways to utilise the services provided by the NWDAF for other Network Functions (NF) like Network Repository Function (NRF), Access and Mobility Management Function (AMF), Session Management Function (SMF), Policy Control Function (PCF), and Network Slice Selection Function (NSSF).

6 Claims, 16 Drawing Sheets

(56) References Cited

OTHER PUBLICATIONS

"3rd Generation Partnership Project; Technical Specification Group Services and System Aspects; System Architecture for the 5G System; Stage 2 (Release 15)", 3GPP TS 23.501 V0.5.0, May 2017, 145 pages.

"3rd Generation Partnership Project; Technical Specification Group Services and System Aspects; Procedures for the 5G System; Stage 2 (Release 15)", 3GPP TS 23.502 V0.4.0, May 2017, 126 pages.

"3rd Generation Partnership Project; Technical Specification Group Services and System Aspects; System Architecture for the 5G System; Stage 2 (Release 15)", 3GPP TS 23.501 V15.0.0, Dec. 2017, 181 pages.

"3rd Generation Partnership Project; Technical Specification Group Services and System Aspects; Procedures for the 5G System; Stage 2 (Release 15)", 3GPP TS 23.502 V15.0.0, Dec. 2017, 258 pages.

International Search Report for PCT/EP2019/054102 dated Mar. 20, 2019 [PCT/ISA/210].

Written Opinion for PCT/EP2019/054102 dated Mar. 20, 2019 [PCT/ISA/237].

\* cited by examiner

NETWORK DATA ANALYTICS FUNCTIONALITY ENHANCEMENT AND NEW SERVICE CONSUMERS

CROSS REFERENCE TO RELATED APPLICATIONS

This application is a National Stage of International Application No. PCT/EP2019/054102 filed Feb. 19, 2019, claiming priority based on European Patent Application No. 18157508.5 filed Feb. 19, 2018.

The present invention relates to a communication system. The invention has particular but not exclusive relevance to wireless communication systems and devices thereof operating according to the 3rd Generation Partnership Project (3GPP) standards or equivalents or derivatives thereof. The invention has particular although not exclusive relevance to network data analytics in the so-called '5G' (or 'Next Generation') systems.

Currently the 3GPP Working Groups are defining the 5G system, and 3GPP TSG SA2 Working Group are specifying the system architecture and procedures for 5G system.

In order to provide network data analytics in 5G network, a new network function called Network Data Analytics Function (NWDAF) is being specified in SA2. According to 3GPP Technical Specification (TS) 23.501 V15.0.0, TS 23.502 V15.0.0, and TS 23.503 V15.0.0 the NWDAF represents operator managed network analytics logical function. The NWDAF provides slice specific network data analytics (e.g. load level information) to the Policy Control Function (PCF) and the Network Slice Selection Function (NSSF) on a network slice level. NWDAF notifies/publishes slice specific network status analytics information to the PCF(s) and NSSF that are subscribed to it. PCF(s) and NSSF can collect directly slice specific network status analytic information from NWDAF. This information is not subscriber specific. The PCF uses that data in its UE and network related policy decisions. The NSSF may use the load level information provided by NWDAF for purposes like slice selection and more.

Currently the NWDAF's functionality is to provide current load level information on network slices only, and the NWDAF have two service consumers only: PCF and NSSF.

This limitation to NWDAF's functionality causes the following problems:
1. If a Session Management Function (SMF) wants to select a most suitable User Plane Function (UPF) during PDU session establishment, only the current load level information is available. It is not possible for the SMF to take both, the current and the historical load level information into account even though statistics load level information based on the historical data would be very useful to optimize the UPF selection.
2. It is also not possible for a network function to obtain the load level information related to a network slice at the granularity of subnet, or a non-slicing related network function (NF).
3. The Network Repository Function (NRF) provides service discovery function and maintains the NF profiles of the available NF instances and the services supported by them. However, if a NF wants to ask NRF to provide load level information of another NF, NRF cannot provide the required information since NRF is not a service customer of NWDAF.
4. During Access and Mobility Management Function (AMF) reroute, AMF cannot take load level information into account for AMF selection, since NWDAF's service cannot be used by AMF directly. It also occurs when AMF wants to consider load level information for SMF selection during PDU session establishment.
5. Even though PCF is a NWDAF's service consumer, it can neither utilise historical statistics load level information nor obtain load level information on non-slicing related network functions to make policy decisions.
6. NSSF also need to face the similar problem to select network slices.

In one exemplary aspect the invention provides a method performed by a Network Data Analytics Function (NWDAF), the method comprising: receiving, from a first network function (NF), a request message for analytics for load of a second NF; performing analytics requested by the request message; and transmitting, to the first NF, a response message including information related to analytics for the load of the second NF.

In one exemplary aspect the invention provides a method performed by a first Network Function (NF), the method comprising: transmitting, to a Network Data Analytics Function (NWDAF), a request message for analytics for load of a second NF; and receiving, from the NWDAF, a response message including information related to analytics for the load of the second NF.

The request message may be an Nnwdaf analytics Info request message, and the response message may be an Nnwdaf analytics info response message.

The request message may be a subscribe request message for Nnwaf analytics, and the response message may be a subscribe response message for Nnwdaf analytics.

The request message may include information indicating a type of analytics.

The request message may include an identifier of the second NF.

The analytics may be of a type that is related to analytics of load of the second NF.

The first NF may be a Session Management Function (SMF).

The analytics may be of a type that is related to an analytics of a load of a User Plane Function (UPF), wherein the request message may include an identifier of the UPF.

The analytics of the load of the UPF may be used for selection of UPF.

The analytics of the load of the UPF may comprise analytics or statistics for UPF load.

The first NF may be an Access and Mobility Management Function (AMF).

The request message may include an identifier of the AMF and information indicating a type of analytics, and wherein the type of analytics is related to analytics of a load of the AMF.

The analytics of the load of the AMF may be used for selection of the AMF during AMF reroute or handover.

The load of the AMF may comprise analytics or statistics for the load of the AMF.

The first NF may be an Access and Mobility Management Function (AMF).

The request message may include an identifier of a Session Management Function (SMF) and information indicating a type of analytics, and wherein the type of analytics is related to analytics of a load of the SMF.

The analytics of the load of the SMF may be used for selection of the SMF during Protocol Data Unit (PDU) session establishment.

The load of the SMF may comprise analytics or statistics for load of the SMF.

The analytics for the load of the second NF may include some levels of granularity.

The levels of granularity may include a network slice level.

The levels of granularity may include a constituent subnet level or a NF of network slice level where a scope of the load Information is per network slice subnet or per network slice NF.

The levels of granularity may include an NF level where a scope of the load may be per specific NF.

The analytics for the load of the second NF may include load pattern information that may include statistics load level information based on an analysis of historical load level information of a network slice, constituent subnet level or NF of network slice, or a specific NF.

The analytics for the load of the second NF may include load pattern information that has a start time and a time interval with granularity.

The analytics for the load of the second NF may include load pattern information that has a validity period that defines a time period for which load information is valid.

The first NF may be Policy Control Function (PCF).

The request message may include an identifier of a specified NF and information indicating a type of analytics, and wherein the type of analytics may be related to analytics of the load of a specified NF.

The analytics of the load of the specified NF may be used for selection of a specified NF in its user equipment (UE) and network related policy decisions.

The load information may be analytics or statistics for load of the specified NF.

In one exemplary aspect the invention provides a Network Data Analytics Function (NWDAF), the NWDAF comprising: a controller and a receiver wherein the controller is configured: to control the transceiver to receive, from a first network function (NF), a request message for analytics for load of a second NF; to perform analytics requested by the request message; and to control the transceiver to transmit, to the first NF, a response message including information related to analytics for the load of the second NF.

In one exemplary aspect the invention provides a Network Function (NF), the NF comprising: a controller and a receiver wherein the controller is configured: to control the transceiver to transmit, to a Network Data Analytics Function (NWDAF), a request message for analytics for load of a second NF; and to control the transceiver to receive, from the NWDAF, a response message including information related to analytics for the load of the second NF.

The invention will now be described, by way of example only, with reference to the attached drawings in which.

Figure 13:
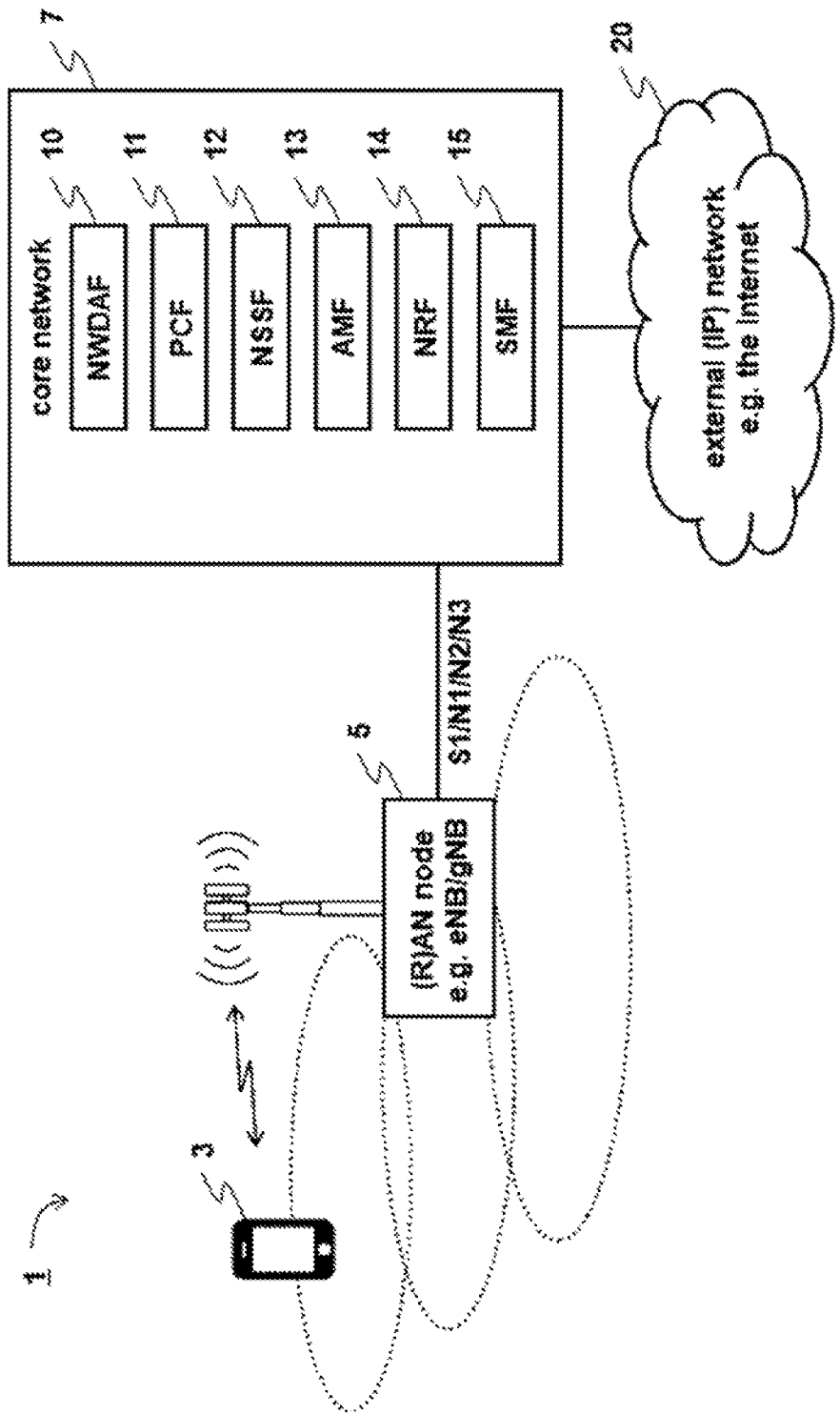
Figure 14:
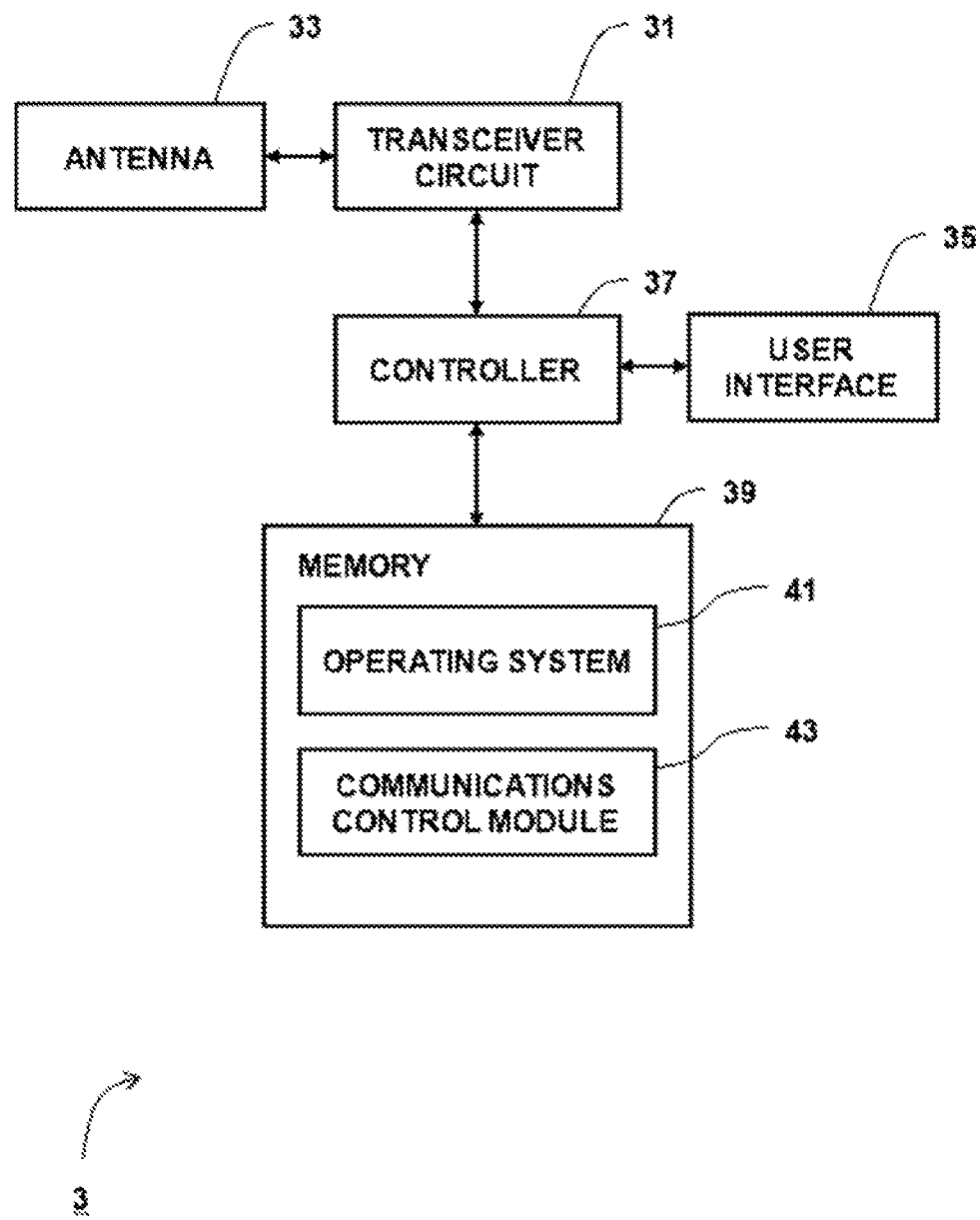
Figure 15:
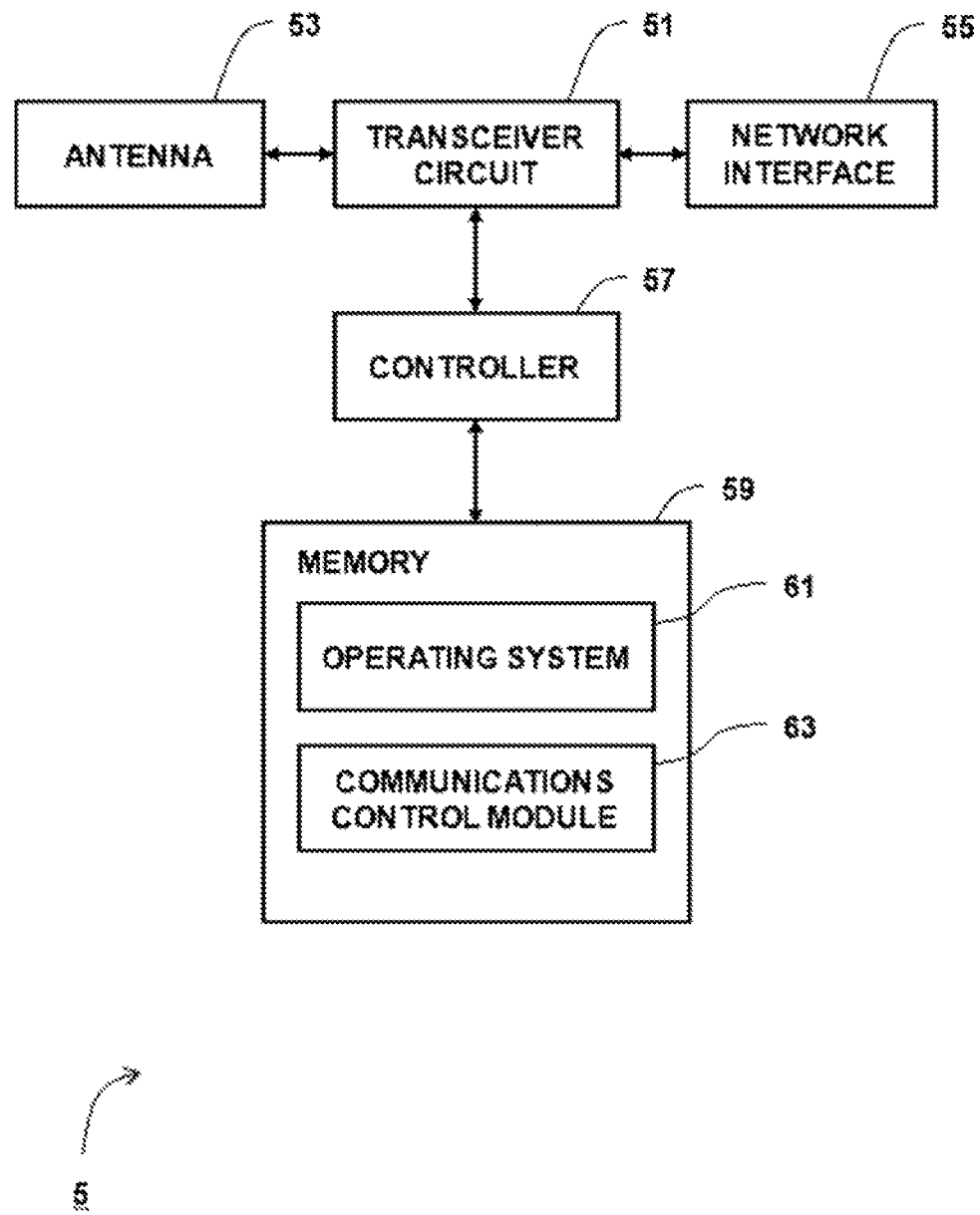
Figure 16:
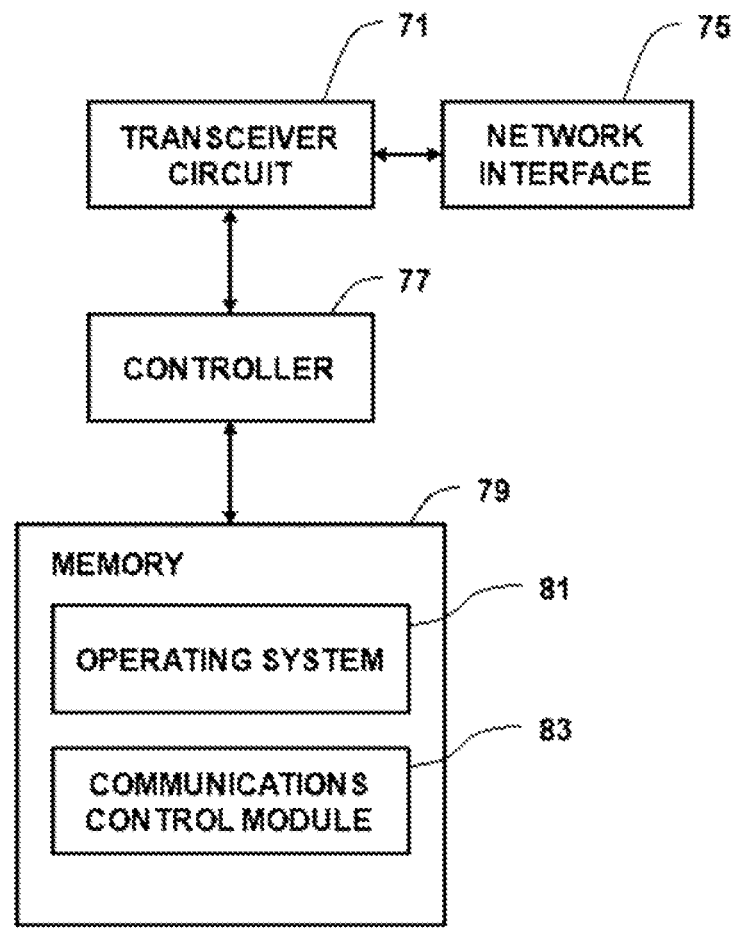

FIG. 13 schematically illustrates a mobile (cellular or wireless) telecommunication system 1 to which the above exemplary embodiments are applicable;

FIG. 14 is a block diagram illustrating the main components of the UE shown in FIG. 13;

FIG. 15 is a block diagram illustrating the main components of an exemplary (R)AN node shown in FIG. 13; and FIG. 16 is a block diagram illustrating the main components of a generic core network node such as an NF or NWDAF.

In order to address the problem of limitations on network data analytics function in 5G network, the inventors propose new parameters on load level information, and exemplary embodiments to utilization of NWDAF services for NRF, AMF, SMF, PCF and NSSF.

EXEMPLARY EMBODIMENT 1: NEW PARAMETERS ON LOAD LEVEL INFORMATION

At least one new parameter sets on load level information has been proposed: at least one of load information type and load information granularity.

Parameter set "Load Information Type"

Within the new parameter set "load information type", there can be two parameters: "current load level information" and "load pattern information". Current load level information of a network slice is the current reading of load level of a network slice, and is the default load level information.

Load pattern information is a new parameter on load level information:
1) Load pattern information includes the statistics load level information based on analysing historical load level information of a network slice;
2) Load pattern information includes Load pattern information can have specified start time, and specified time interval with granularity;
3) Load pattern information includes validity period which defines the time period for which the load information is valid.

Parameter set "Load Information Granularity"

Within the new parameter set "Load Information Granularity", there can be some levels. For example, the following shows three levels:
1) network slice level which is the default one. In this case the scope of the Load information is per network slice;
2) constituent subnet level or NF of network slice where the scope of the Load Information is per network slice subnet or network slice NF;
3) at a NF level where the scope of the Load Information is per specific NF, such as SMF.

EXEMPLARY EMBODIMENT 2: NRF AS A NEW SERVICE CONSUMER OF NWDAF BASED ON SERVICE-BASED ARCHITECTURE

The main idea of this exemplary embodiment is as follow: Since NWDAF is responsible for providing network data analytics for the network, NRF is proposed to be a new service consumer of NWDAF. Two new procedures are proposed—for service subscription and for on demand service.

service subscription: NRF subscribes with NWDAF to receive analytics or/and statistics information (load information or any other type of information) periodically or when threshold value is reached. NWDAF notifies/publishes NF-related or network slicing-related analytics or/and statistics information (e.g. load level information) to the NRF that are subscribed to it.

on demand: NRF collects directly NF-related or network slicing-related analytics or/and statistics information (e.g. load level information or any other type of information) from NWDAF.

Procedure for Service Based Interaction Between NWDAF and NRF—Service Subscription This procedure is used by NRF to subscribe/unsubscribe at NWDAF to be notified on NF-related or network slicing-related analytics or/and statistics information (e.g. load level information). The subscription could be for periodic notification, for a notification at reaching a threshold or any other type of notification.

Figure 1:
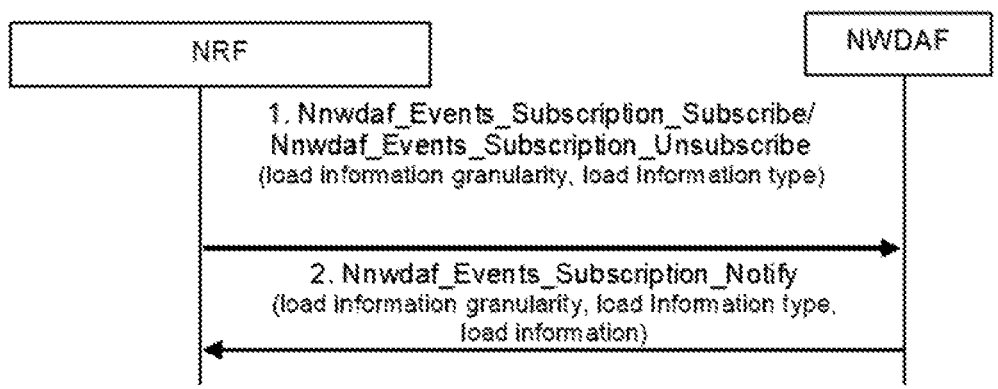
FIG. 1 shows a procedure for Service based interaction between NWDAF and NRF (service subscription)

As shown in FIG. 1, there are two steps in this procedure:
1. NRF subscribes or unsubscribes for NF-related or network slicing-related analytics or/and statistics information (e.g. load level information) by invoking the Nnwdaf_Events_Subscription_Subscribe/Nnwdaf_Events_Subscription_Unsubscribe service or any other name of a service procedure or message for the purpose of subscribing or unsubscribing with the NWDAF for NF-related or network slicing-related analytics or/and statistics information which may include parameters for load information granularity, and load information type. Load information granularity can be a network slice instance ID (e.g. NSI ID or S-NSSAI(s) ID) or an identifier for related subnet or NF identifier (e.g. AMF Identifier).
2. If NRF subscribes to NF-related or network slicing-related analytics or/and statistics information information (e.g. load level information), the NWDAF provides NRF with NF-related or network slicing-related statistics information (e.g. load level information) by invoking Nnwdaf_Events_Subscription_Notify service or any other name of a service procedure or message for the purpose of subscription information provision which may include parameters like load information granularity, load information type and required load information. Required load information is the reading or analytics result of load information.

Procedure for Service Based Interaction Between NWDAF and NRF—on Demand

In this procedure, NRF should be able to request and get from NWDAF required NF-related or network slicing-related analytics or/and statistics information (e.g. load level information).

Figure 2:
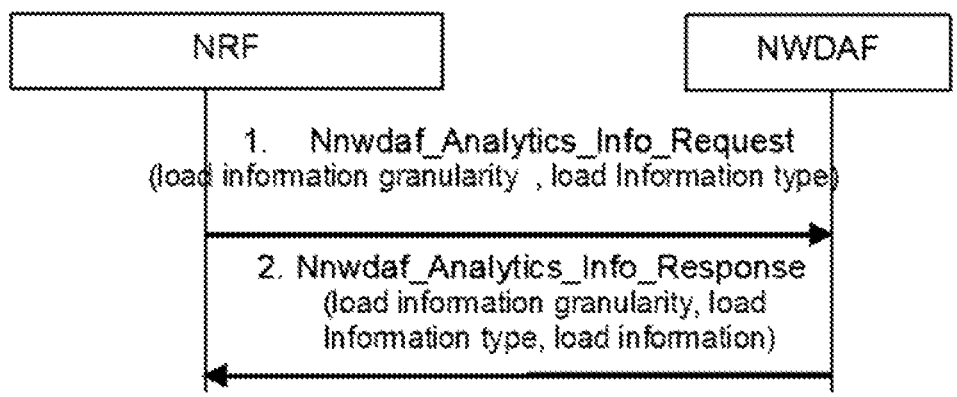
FIG. 2 shows a procedure for Service based interaction between NWDAF and NRF (on demand)

As shown in FIG. 2, there are two steps in this procedure:
1. NRF requests NF-related or network slicing-related analytics or/and statistics information (e.g. load level information) by invoking Nnwdaf_Analytics_Info_Request service or any other name of a service procedure or message for the purpose of requesting analytics or/and statistics information from the NWDAF which may include parameters for load information granularity, and load information type. Load information granularity can be network slice instance ID (e.g. NSI or S-NSSAI ID) or identifier for related subnet or NF ID (e.g. AMF ID).
2. The NWDAF responds with NF-related or network slicing-related analytics or/and statistics information (e.g. load level information) by invoking Nnwdaf_Analytics_Info_Response service or any other name of a service procedure or message for the purpose of responding with analytics or/and statistics information from the NWDAF which may include parameters for load information granularity, load information type and required load information. Required load information is the reading or analytics result of load information.

EXEMPLARY EMBODIMENT 3: AMF AS A NEW SERVICE CONSUMER OF NWDAF BASED ON SERVICE-BASED ARCHITECTURE

The main idea of this exemplary embodiment is as follow: Since NWDAF is responsible for providing network data analytics and statistics for the network, AMF is proposed to be a new service consumer of NWDAF.

There are two scenarios on how the AMF makes use of the NWDAF's services:
selection of the most suitable AMF during AMF reroute/handover; and
selection of the most suitable SMF during PDU session establishment procedure.

For each scenario, two new procedures has been proposed for service subscription/unsubscription and for on demand service request type:
service subscription/unsubscription: AMF subscribes at NWDAF to receive information periodically or at reaching a threshold value. NWDAF notifies/publishes NF-related analytics/statistics information (e.g. load level information) to the AMF that are subscribed to it.
on demand: AMF collects directly NF-related analytics/statistics information (e.g. load level information) from NWDAF with a designated req/rsp procedure.

Scenario A: AMF Selection During AMF Reroute/Handover
Procedure for Service Based Interaction Between NWDAF and AMF—Service Subscription This procedure is used by AMF to subscribe/unsubscribe at NWDAF to be notified AMF related analytics or/and statistics information (e.g. load level information) for a particular AMF. Periodic notification and notification upon threshold exceeded can be subscribed.

Figure 3:
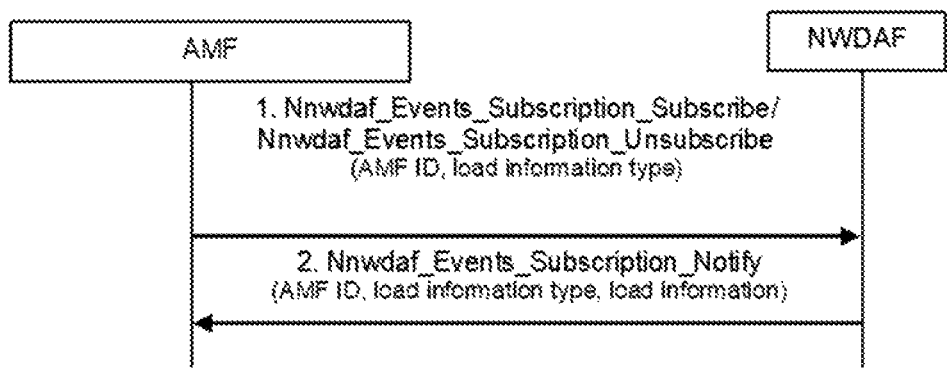
FIG. 3 shows a procedure for Service based interaction between NWDAF and AMF (service subscription) for the use case during AMF reroute/handover.

As shown in FIG. 3, there are two steps in this procedure:
1. AMF subscribes or unsubscribes for AMF related analytics or/and statistics information (e.g. load level information) by invoking the Nnwdaf_Events_Subscription_Subscribe/Nnwdaf_Events_Subscription_Unsubscribe service or any other name of a service procedure or message for the purpose of subscribing or unsubscribing with the NWDAF for AMF related information which may include parameters for AMF ID and load information type.
2. If AMF subscribes to AMF related analytics or/and statistics information (e.g. load level information), the NWDAF provides AMF with AMF related information (e.g. load level information) by invoking Nnwdaf_Events_Subscription_Notify service or any other name of a service procedure or message for the purpose of AMF related information provision which may include parameters like AMF ID, load information type, and required load information. Required load information is the reading or analytics result of load information.

Procedure for Service Based Interaction Between NWDAF and AMF—on Demand

AMF should be able to request and get from NWDAF required AMF related analytics or/and statistics information (e.g. load level information).

Figure 4:
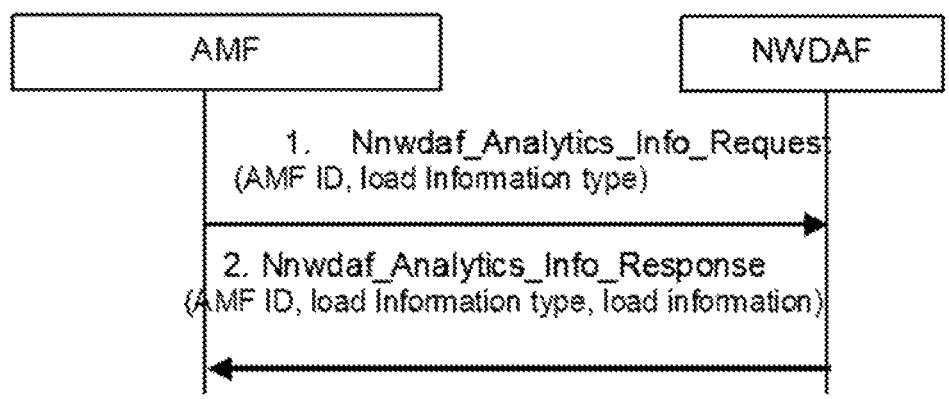
FIG. 4 shows a procedure for Service based interaction between NWDAF and AMF (on demand) (for the use case during AMF reroute/handover)

As shown in FIG. 4, there are two steps in this procedure:
1. AMF requests AMF related analytics or/and statistics information (e.g. load level information) for a particular AMF by invoking Nnwdaf_Analytics_Info_Request service or any other name of a service procedure or message for the purpose of requesting AMF related information from the NWDAF which may include parameters for the AMF ID and for the load information type.
2. The NWDAF responds with AMF related analytics or/and statistics information (e.g. load level information) for a particular AMF by invoking Nnwdaf_Analytics_Info_Response service or any other name of a service procedure or message for the purpose of responding with the AMF related analytics or/and statistics information from the NWDAF which may include parameters for the AMF ID, load information type, and required load information. Required load information is the reading or analytics result of load information.

Scenario B: SMF Selection During PDU Session Establishment

Procedure for Service Based Interaction Between NWDAF and AMF—Service Subscription This procedure is used by AMF to subscribe/unsubscribe at NWDAF to be notified AMF related analytics or/and statistics information (e.g. load level information) for a particular SMF. Periodic notification and notification upon threshold exceeded can be subscribed.

Figure 5:
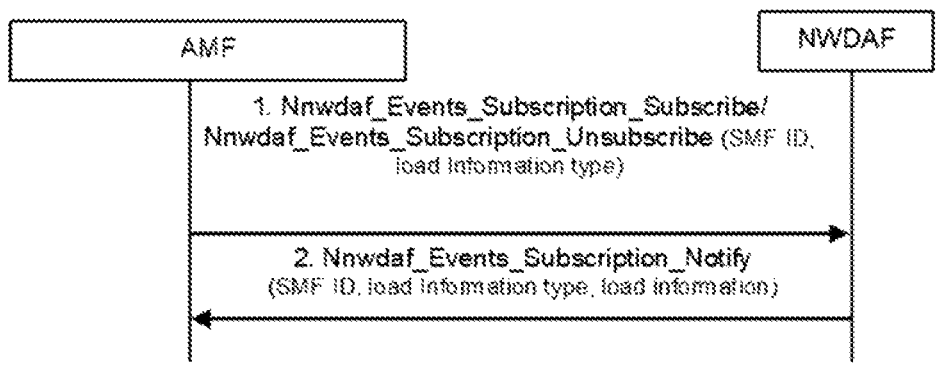
FIG. 5 shows a procedure for Service based interaction between NWDAF and AMF (service subscription) (for the use case during PDU session establishment)

As shown in FIG. 5, there are two steps in this procedure:
1. AMF subscribes to or cancels subscription to SMF related analytics or/and statistics information (e.g. load level information) by invoking the Nnwdaf_Events_Subscription_Subscribe/Nnwdaf_Events_Subscription_Unsubscribe service or any other name of a service procedure or message for the purpose of subscribing or unsubscribing with the NWDAF for SMF related analytics or/and statistics information which may include parameters for with the SMF ID and load information type.
2. If AMF subscribes to SMF related analytics or/and statistics information (e.g. load level information), the NWDAF provides AMF with SMF related analytics or/and statistics information (e.g. load level information) by invoking Nnwdaf_Events_Subscription_Notify service or any other name of a service procedure or message for the purpose of SMF related subscription information provision which may include parameters like with SMF ID, load information type, and required load information. Required load information is the reading or analytics result of load information.

Procedure for Service Based Interaction Between NWDAF and AMF—on Demand

AMF should be able to request and get from NWDAF required SMF related analytics or/and statistics information (e.g. load level information).

Figure 6:
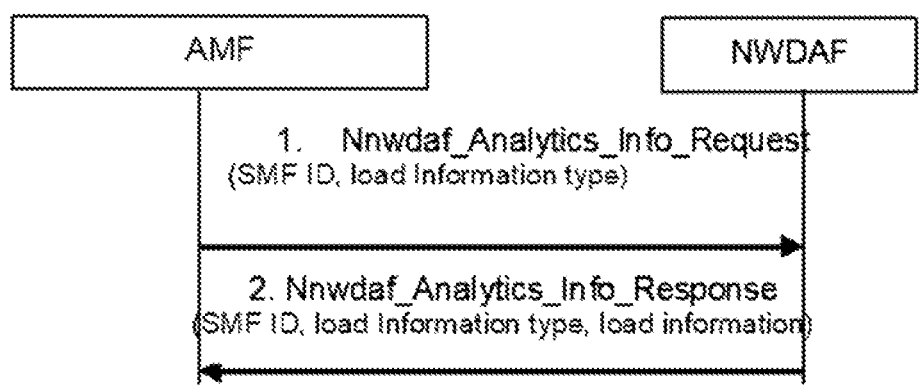
FIG. 6 shows a procedure for Service based interaction between NWDAF and AMF (on demand) (for the use case during PDU session establishment)

As shown in FIG. 6, there are two steps in this procedure:
1. AMF requests SMF related analytics or/and statistics information (e.g. load level information) for a particular SMF by invoking Nnwdaf_Analytics_Info_Request service or any other name of a service procedure or message for the purpose of requesting SMF related information from the NWDAF which may include parameters for the SMF ID and load information type.
2. The NWDAF responds with SMF related analytics or/and statistics information (e.g. load level information) for a particular SMF by invoking Nnwdaf_Analytics_Info_Response service or any other name of a service procedure or message for the purpose of responding with the SMF related information from the NWDAF which may include parameters for the SMF ID, load information type, and required load information. Required load information is the reading or analytics result of load information.

EXEMPLARY EMBODIMENT 4: SMF USE NEW PARAMETERS FROM NWDAF SERVICES TO SELECT UPF

The main idea of this exemplary embodiment is as follow: Add new load information type (e.g. Load pattern information) when SMF is a service consumer of NWDAF.

Two new procedures have been proposed for service subscription and on demand service type:
  service subscription: SMF subscribes at NWDAF to receive information periodically or at threshold value. NWDAF notifies/publishes NF-related analytics or/and statistics information information (e.g. load level information) to the SMF that is subscribed for it.
  on demand: SMF collects directly NF-related analytics or/and statistics information information (e.g. load level information) from NWDAF.

Procedure for Service Based Interaction Between NWDAF and SMF—Service Subscription This procedure is used by SMF to subscribe/unsubscribe at NWDAF to be notified on UPF related analytics or/and statistics information (e.g. load level information). The subscription could be for periodic notification, for a notification at reaching a threshold or any other type of notification.

Figure 7:
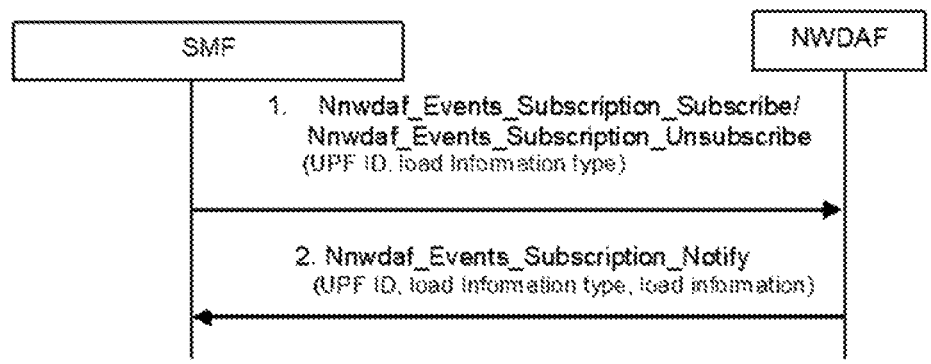
FIG. 7 shows a procedure for Service based interaction between NWDAF and SMF (service subscription)

As shown in FIG. 7, there are two steps in this procedure:
1. SMF subscribes to or cancels subscription to UPF related analytics or/and statistics information (e.g. load level information) by invoking the Nnwdaf_Events_Subscription_Subscribe/Nnwdaf_Events_Subscription_Unsubscribe service or any other name of a service procedure or message for the purpose of subscribing or unsubscribing with the NWDAF for UPF related information which may include parameters for UPF ID and load information type. Load Information type can include load pattern information.
2. If SMF subscribe to UPF related analytics or/and statistics information (e.g. load level information), the NWDAF provides SMF UPF related information (e.g. load level information) by invoking Nnwdaf_Events_Subscription_Notify service or any other name of a service procedure or message for the purpose of UPF related subscription information provision which may include parameters like UPF ID, load information type, and required load information.

Procedure for Service Based Interaction Between NWDAF and SMF—on Demand

SMF should be able to request and get from NWDAF required UPF related analytics or/and statistics information (e.g. load level information).

Figure 8:
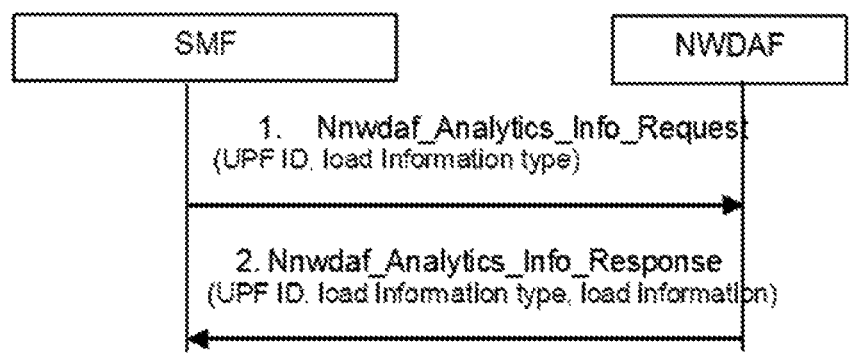
FIG. 8 shows a procedure for Service based interaction between NWDAF and SMF (on demand)

As shown in FIG. 8, there are two steps in this procedure:
1. SMF UPF related analytics or/and statistics information (e.g. load level information) by invoking Nnwdaf_Analytics_Info_Request service or any other name of a service procedure or message for the purpose of requesting UPF related information from the NWDAF which may include parameters for the UPF ID and load information type. Load Information type can include load pattern information.
2. The NWDAF responds with UPF related analytics or/and statistics information (e.g. load level information) by invoking Nnwdaf_Analytics_Info_Response service or any other name of a service procedure or message for the purpose of responding with the UPF related information from the NWDAF which may include parameters for the UPF ID, load information type, and required load information.

EXEMPLARY EMBODIMENT 5: PCF USE NEW PARAMETERS FROM NWDAF SERVICES IN ITS UE AND NETWORK RELATED POLICY DECISIONS

The main idea of this exemplary embodiment is as follow: Add new load information type (e.g. Load pattern information) when PCF is a service consumer of NWDAF.

Two new procedures are proposed—for service subscription and for on demand service:
  service subscription: PCF subscribes with NWDAF to receive information (load information or any other type of information) periodically or when threshold value is reached. NWDAF notifies/publishes NF-related or network slicing-related analytics or/and statistics information information (e.g. load level information) to the PCF that are subscribed to it.
  on demand: PCF collects directly NF-related or network slicing-related analytics or/and statistics information information (e.g. load level information or any other type of information) from NWDAF.

Procedure for Service Based Interaction Between NWDAF and PCF—Service Subscription This procedure is used by PCF to subscribe/unsubscribe at NWDAF to be notified on NF-related or network slicing-related analytics or/and statistics information (e.g. load level information). The subscription could be for periodic notification, for a notification at reaching a threshold or any other type of notification.

Figure 9:
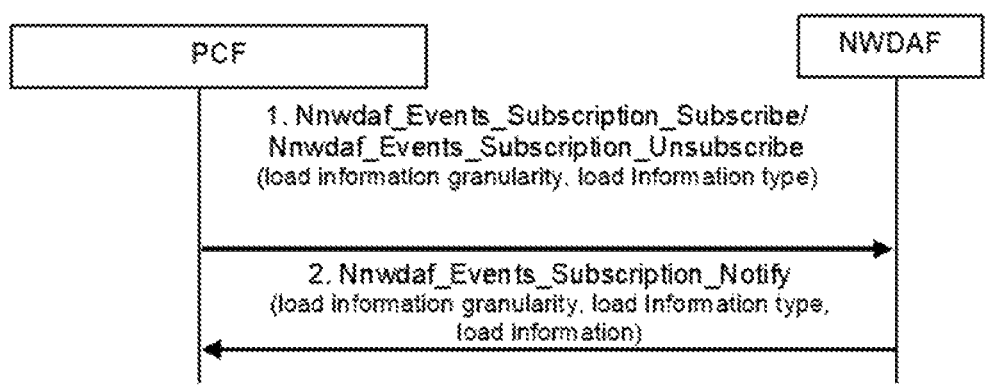
FIG. 9 shows a procedure for Service based interaction between NWDAF and PCF (service subscription)

As shown in FIG. 9, there are two steps in this procedure:
1. PCF subscribes or unsubscribes for NF-related or network slicing-related analytics or statistics information (e.g. load level information) by invoking the Nnwdaf_Events_Subscription_Subscribe/Nnwdaf_Events_Subscription_Unsubscribe service or any other name of a service procedure or message for the purpose of subscribing or unsubscribing with the NWDAF for NF-related or network slicing-related information which may include parameters for load information granularity, and load information type. Load information granularity can be a network slice instance ID (e.g. NSI ID or S-NSSAI(s) ID) or an identifier for related subnet or NF identifier (e.g. AMF Identifier). Load Information type can include load pattern information.
2. If PCF subscribes to NF-related statistics information (e.g. load level information) the NWDAF provides PCF with NF-related or network slicing-related statistics information (e.g. load level information) by invoking Nnwdaf_Events_Subscription_Notify service or any other name of a service procedure or message for the purpose of subscription information provision which may include parameters like load information granularity, load information type and required load information. Required load information is the reading or analytics result of load information.

Procedure for Service Based Interaction Between NWDAF and PCF—on Demand

In this procedure, PCF should be able to request and get from NWDAF required NF-related or network slicing-related analytics or/and statistics information (e.g. load level information).

Figure 10:
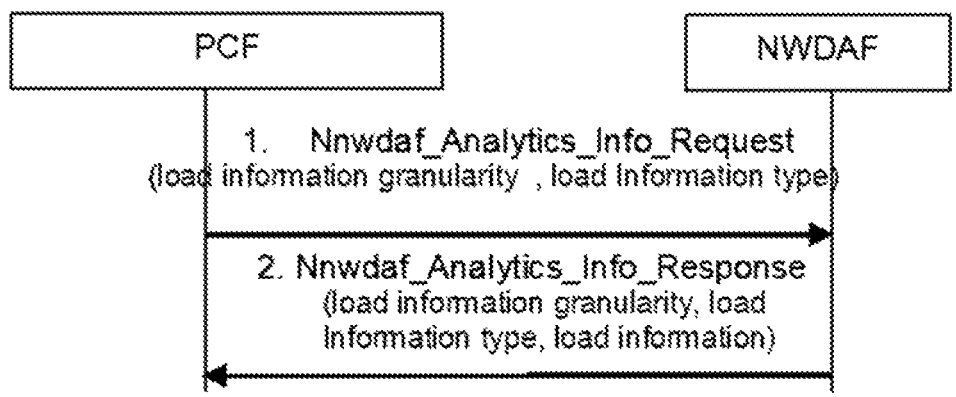
FIG. 10 shows a procedure for Service based interaction between NWDAF and PCF (on demand)

As shown in FIG. 10, there are two steps in this procedure:
1. PCF requests NF-related or network slicing-related analytics or/and statistics information information (e.g. load level information) by invoking Nnwdaf_Analytics_Info_Request service or any other name of a service procedure or message for the purpose of requesting analytics or/and statistics information from the NWDAF which may include parameters for load information granularity, and load information type. Load information granularity can be network slice instance ID (e.g. NSI or S-NSSAI ID) or identifier for related subnet or NF ID (e.g. AMF ID). Load Information type can include load pattern information.
2. The NWDAF responds with NF-related or network slicing-related analytics or/and statistics information information (e.g. load level information) by invoking Nnwdaf_Analytics_Info_Response service or any other name of a service procedure or message for the purpose of responding with the or/and statistics information from the NWDAF which may include parameters for load information granularity, load information type and required load information. Required load information is the reading or analytics result of load information.

EXEMPLARY EMBODIMENT 6: NSSF USE NEW PARAMETERS FROM NWDAF SERVICES TO SELECT NETWORK SLICES

The main idea of this exemplary embodiment is as follow: Add new load information type (e.g. Load pattern information) when NSSF is a service consumer of NWDAF.

Two new procedures are proposed—for service subscription and for on demand service:
  service subscription: NSSF subscribes with NWDAF to receive analytics or/and statistics information (load information or any other type of information) periodically or when threshold value is reached. NWDAF notifies/publishes NF-related or network slicing-related analytics or/and statistics information information (e.g. load level information) to the NSSF that are subscribed to it.
  on demand: NSSF collects directly NF-related or network slicing-related analytics or/and statistics information information (e.g. load level information or any other type of information) from NWDAF.

Procedure for Service Based Interaction Between NWDAF and NSSF—Service Subscription This procedure is used by NSSF to subscribe/unsubscribe at NWDAF to be notified on NF-related or network slicing-related analytics or/and statistics information (e.g. load level information). The subscription could be for periodic notification, for a notification at reaching a threshold or any other type of notification.

Figure 11:
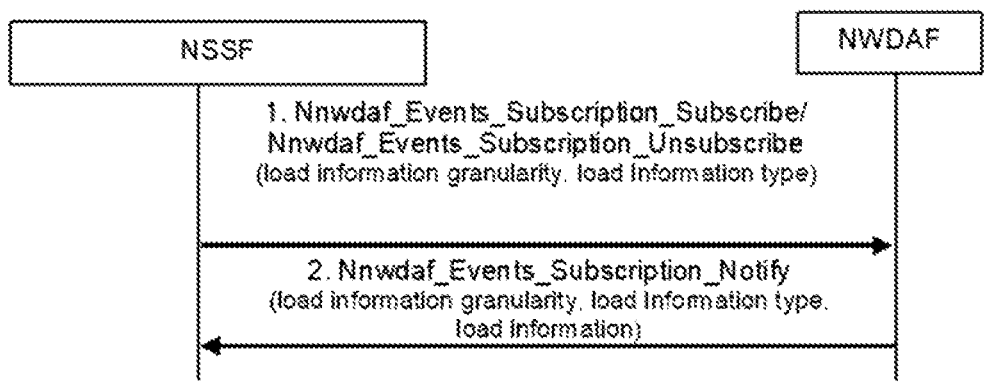
FIG. 11 shows a procedure for Service based interaction between NWDAF and NSSF (service subscription)

As shown in FIG. 11, there are two steps in this procedure:
1. NSSF subscribes or unsubscribes for NF-related or network slicing-related analytics or statistics information (e.g. load level information) by invoking the Nnwdaf_Events_Subscription_Subscribe/Nnwdaf_Events_Subscription_Unsubscribe service or any other name of a service procedure or message for the purpose of subscribing or unsubscribing with the NWDAF for NF-related or network slicing-related information which may include parameters for load information granularity, and load information type. Load information granularity can be a network slice instance ID (e.g. NSI ID or S-NSSAI(s) ID) or an identifier for related subnet or NF identifier (e.g. AMF Identifier). Load Information type can include load pattern information.
2. If NSSF subscribes to NF-related or network slicing-related analytics or/and statistics information information (e.g. load level information) the NWDAF provides NSSF with NF-related or network slicing-related analytics or/and statistics information information (e.g. load level information) by invoking Nnwdaf_Events_Subscription_Notify service or any other name of a service procedure or message for the purpose of subscription information provision which may include parameters like load information granularity, load information type and required load information. Required load information is the reading or analytics result of load information.

Procedure for Service Based Interaction Between NWDAF and NSSF—on Demand

In this procedure, NSSF should be able to request and get from NWDAF required NF-related or network slicing-related analytics or/and statistics information (e.g. load level information).

Figure 12:
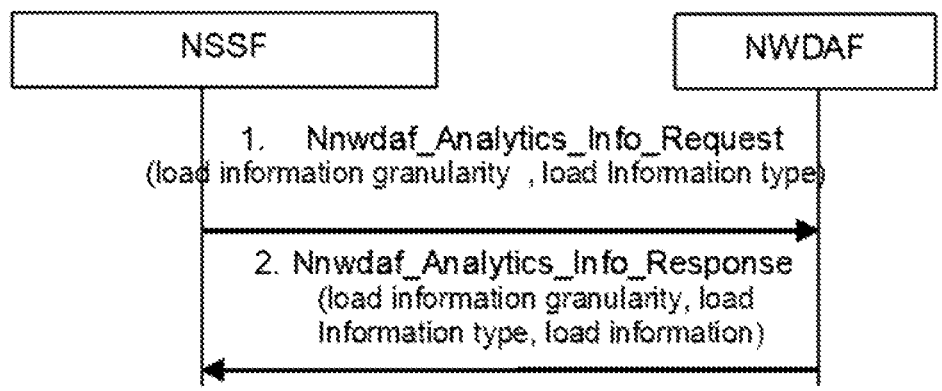
FIG. 12 shows a procedure for Service based interaction between NWDAF and NSSF (on demand)

As shown in FIG. 12, there are two steps in this procedure:
1. NSSF requests NF-related or network slicing-related statistics information (e.g. load level information) by invoking Nnwdaf_Analytics_Info_Request service or any other name of a service procedure or message for the purpose of requesting analytics or/and statistics information from the NWDAF which may include parameters for load information granularity, and load information type. Load information granularity can be network slice instance ID (e.g. NSI or S-NSSAI ID) or identifier for related subnet or NF ID (e.g. AMF ID). Load Information type can include load pattern information.
2. The NWDAF responds with NF-related or network slicing-related analytics or/and statistics information information (e.g. load level information) by invoking Nnwdaf_Analytics_Info_Response service or any other name of a service procedure or message for the purpose of responding with analytics or/and statistics information information from the NWDAF which may include parameters for load information granularity, load information type and required load information. Required load information is the reading or analytics result of load information.

SUMMARY

Beneficially, the above described exemplary embodiments include, although they are not limited to, one or more of the following functionalities.

Exemplary Embodiment 1

1) Two new parameter sets on load level information has been proposed: load information type and load information granularity.
2) Within the parameter set "load information type", a new parameter "load pattern information" has been proposed to provide broader load level information.
3) Within the parameter set "load information granularity", new parameters "at constituent subnet level or NF of network slice" and "at a NF level" are proposed to widen the scope of load level information.

Exemplary Embodiment 2

1) Based on service-based architecture, NRF has been proposed as a new service consumer of NWDAF.
2) Two new procedures has been proposed for service subscription and on demand service type.
3) New parameters have been used load information type and load information granularity in the messages exchanged between NRF and NWDAF.

Exemplary Embodiment 3

1) Based on service-based architecture, AMF has been proposed as a new service consumer of NWDAF.
2) In order to address the problems facing by AMF to uses the NWDAF's services in two different scenarios, namely for AMF selection during AMF reroute/handover or SMF selection during PDU session establishment, two new procedures have been proposed for service subscription and on demand service type for each scenario.
3) New parameters have been used load information type and load information granularity in the messages exchanged between AMF and NWDAF.

Exemplary Embodiment 4

1) In order to optimize the selection of UPF by SMF, two new procedures has been proposed for service subscription and on demand service type.
2) New parameters have been used load information type and load information granularity in the messages exchanged between SMF and NWDAF.

Exemplary Embodiment 5

1) In order to optimize UE and network related policy decisions by PCF, two new procedures has been proposed for service subscription and on demand service type.
2) New parameters have been used load information type and load information granularity in the messages exchanged between PCF and NWDAF.

Exemplary Embodiment 6

1) In order to optimize UE and network related policy decisions by NSSF, two new procedures has been proposed for service subscription and on demand service type.
2) New parameters have been used load information type and load information granularity in the messages exchanged between NSSF and NWDAF.

It can be seen that the above exemplary embodiments describe various exemplary procedures in which:

1) Parameter set "load information type" with parameter "load pattern information" is used.
2) Parameter set "load information granularity", with parameter parameters "at constituent subnet level or NF of network slice" or "at a NF level" are used.
3) NRF uses NWDAF's service via service subscription and on demand.
4) AMF uses NWDAF's service via service subscription and on demand, for AMF selection during AMF reroute/handover or SMF selection during PDU session establishment.
5) SMF uses NWDAF's services via service subscription and on demand with new parameter sets "load information type" with parameter "load pattern information" or Parameter set "load information granularity", with parameter parameters "at constituent subnet level or NF of network slice" or "at a NF level".
6) PCF uses NWDAF's services via service subscription and on demand with new parameter sets "load information type" with parameter "load pattern information" or Parameter set "load information granularity", with parameter parameters "at constituent subnet level or NF of network slice" or "at a NF level".
7) NSSF uses NWDAF's services via service subscription and on demand with new parameter sets "load information type" with parameter "load pattern information" or Parameter set "load information granularity", with parameter parameters "at constituent subnet level or NF of network slice" or "at a NF level".

Benefits

It can be seen that the above exemplary embodiments beneficially provide a number of benefits, including (but not limited to):

The proposed exemplary embodiments can provide network data analytics to different network functions to optimise the network performance.

System Overview

FIG. 13 schematically illustrates a mobile (cellular or wireless) telecommunication system 1 to which the above exemplary embodiments are applicable.

In this network, users of mobile devices 3 (UEs) can communicate with each other and other users via respective base stations 5 and a core network 7 using an appropriate 3GPP radio access technology (RAT), for example, an E-UTRA and/or 5G RAT. It will be appreciated that a number of base stations 5 form a (radio) access network or (R)AN. As those skilled in the art will appreciate, whilst one mobile device 3 and one base station 5 are shown in FIG. 13 for illustration purposes, the system, when implemented, will typically include other base stations and mobile devices (UEs).

Each base station 5 controls one or more associated cells (either directly or via other nodes such as home base stations, relays, remote radio heads, and/or the like). A base station 5 that supports E-UTRA/4G protocols may be referred to as an 'eNB' and a base station 5 that supports NextGeneration/5G protocols may be referred to as a 'gNBs'. It will be appreciated that some base stations 5 may be configured to support both 4G and 5G, and/or any other 3GPP or non-3GPP communication protocols.

The core network 7 typically includes logical nodes (or 'functions') for supporting communication in the telecommunication system 1. Typically, for example, the core network 7 of a 'Next Generation'/5G system will include, amongst other functions, control plane functions and user plane functions.

In this example, the core network 7 includes, amongst others, a Network Data Analytics Function (NWDAF) 10, a Policy Control Function (PCF) 11, a Network Slice Selection Function (NSSF) 12, an Access and Mobility Function (AMF) 13, a Network Repository Function (NRF) 14, and a Session Management Function (SMF) 15. It will be appreciated that some of these functions are optional (at least in some exemplary embodiments).

The mobile device 3 and its serving base station 5 are connected via an appropriate air interface (for example the so-called 'Uu' interface and/or the like). Neighbouring base stations 5 are connected to each other via an appropriate base station to base station interface (such as the so-called 'X2' interface, 'Xn' interface and/or the like). The base station 5 is also connected to the core network nodes via an appropriate interface (such as the so-called 'S1', 'N1', 'N2', 'N3' interface, and/or the like). From the core network 7, connection to an external IP network 20 (such as the Internet) is also provided.

User Equipment (UE)

FIG. 14 is a block diagram illustrating the main components of the UE (mobile device 3) shown in FIG. 13. As shown, the UE includes a transceiver circuit 31 which is operable to transmit signals to and to receive signals from the connected node(s) via one or more antenna 33. Although not necessarily shown in FIG. 14, the UE will of course have all the usual functionality of a conventional mobile device (such as a user interface 35) and this may be provided by any one or any combination of hardware, software and firmware, as appropriate. A controller 37 controls the operation of the UE in accordance with software stored in a memory 39. The software may be pre-installed in the memory 39 and/or may be downloaded via the telecommunication network 1 or from a removable data storage device (RMD), for example. The software includes, among other things, an operating system 41 and a communications control module 43. The communications control module 43 is responsible for handling (generating/sending/receiving) signalling messages and uplink/downlink data packets between the UE 3 and other nodes, including (R)AN nodes 5 and core network nodes.

(R)AN Node

FIG. 15 is a block diagram illustrating the main components of an exemplary (R)AN node 5 (base station) shown in FIG. 13. As shown, the (R)AN node 5 includes a transceiver circuit 51 which is operable to transmit signals to and to receive signals from connected UE(s) 3 via one or more antenna 53 and to transmit signals to and to receive signals from other network nodes (either directly or indirectly) via a network interface 55. The network interface 55 typically includes an appropriate base station—base station interface (such as X2/Xn) and an appropriate base station—core network interface (such as S1/N1/N2/N3). A controller 57 controls the operation of the (R)AN node 5 in accordance with software stored in a memory 59. The software may be pre-installed in the memory 59 and/or may be downloaded via the telecommunication network 1 or from a removable data storage device (RMD), for example. The software includes, among other things, an operating system 61 and a communications control module 63. The communications control module 63 is responsible for handling (generating/sending/receiving) signalling between the (R)AN node 5 and other nodes, such as the UE 3 and the core network nodes. The communications control module 63 is also responsible for communicating data packets for each UE using a network slice that is appropriate for that UE.

Core Network Node

FIG. 16 is a block diagram illustrating the main components of a generic core network node, for example, NWDAF 10, PCF 11, NSSF 12, AMF 13, NRF 14, or SMF 15. As shown, the core network node includes a transceiver circuit 71 which is operable to transmit signals to and to receive signals from other nodes (including the UE 3, the (R)AN node 5, and other core network nodes) via a network interface 75. A controller 77 controls the operation of the core network node in accordance with software stored in a memory 79. The software may be pre-installed in the memory 79 and/or may be downloaded via the telecommunication network 1 or from a removable data storage device (RMD), for example. The software includes, among other things, an operating system 81 and a communications control module 83. The communications control module 83 is responsible for handling (generating/sending/receiving) signaling between the core network node and other nodes, such as the UE 3, (R)AN node 5, and other core network nodes. It will be appreciated that, depending on its configuration, the core network node may have additional modules. For example, the NWDAF 10 may include a module for performing slice specific network data analytics (and for providing such analytics to other nodes).

Modifications and Alternatives

Detailed exemplary embodiments have been described above. As those skilled in the art will appreciate, a number of modifications and alternatives can be made to the above exemplary embodiments whilst still benefiting from the inventions embodied therein. By way of illustration only a number of these alternatives and modifications will now be described.

In the above description, the UE, the (R)AN node, and the core network node are described for ease of understanding as having a number of discrete modules (such as the communication control modules). Whilst these modules may be provided in this way for certain applications, for example where an existing system has been modified to implement the invention, in other applications, for example in systems designed with the inventive features in mind from the outset, these modules may be built into the overall operating system or code and so these modules may not be discernible as discrete entities. These modules may also be implemented in software, hardware, firmware or a mix of these.

Each controller may comprise any suitable form of processing circuitry including (but not limited to), for example: one or more hardware implemented computer processors; microprocessors; central processing units (CPUs); arithmetic logic units (ALUs); input/output (IO) circuits; internal memories/caches (program and/or data); processing registers; communication buses (e.g. control, data and/or address buses); direct memory access (DMA) functions; hardware or software implemented counters, pointers and/or timers; and/or the like.

In the above exemplary embodiments, a number of software modules were described. As those skilled in the art will appreciate, the software modules may be provided in compiled or un-compiled form and may be supplied to the UE, the (R)AN node, and the core network node as a signal over a computer network, or on a recording medium. Further, the functionality performed by part or all of this software may be performed using one or more dedicated hardware circuits. However, the use of software modules is preferred as it facilitates the updating of the UE, the (R)AN node, and the core network node in order to update their functionalities.

The above exemplary embodiments are also applicable to 'non-mobile' or generally stationary user equipment.

Various other modifications will be apparent to those skilled in the art and will not be described in further detail here.

LIST OF REFERENCES

[1] TS 23.501 V15.0.0
[2] TS 23.502 V15.0.0
[3] TS 23.503 V15.0.0

The invention claimed is:

1. A method performed by a Network Data Analytics Function (NWDAF), the method comprising:
   receiving, from an Access and Mobility Management Function (AMF), a request message for analytics for a load of a Session Management Function (SMF) which is different from the NWDAF;
   performing the analytics requested by the request message; and
   transmitting, to the AMF, a response message including load statistics information of the SMF corresponding to an analytics target period and validity information indicating a time period for which the load statistics information of the SMF is valid.

2. A method performed by an Access and Mobility Management Function (AMF), the method comprising:
   transmitting, to a Network Data Analytics Function (NWDAF), a request message for analytics for a load of a Session Management Function (SMF) which is different from the NWDAF; and
   receiving, from the NWDAF, a response message including load statistics information of the SMF corresponding to an analytics target period and validity information indicating a time period for which the load statistics information of the SMF is valid.

3. A Network Data Analytics Function (NWDAF) comprising:
   a controller; and
   a transceiver,
   wherein the controller is configured to:
   control the transceiver to receive, from an Access and Mobility Management Function (AMF), a request message for analytics for a load of a Session Management Function (SMF) which is different from the NWDAF;
   perform the analytics requested by the request message; and
   control the transceiver to transmit, to the AMF, a response message including load statistics information of the SMF corresponding to an analytics target period and validity information indicating a time period for which the load statistics information of the SMF is valid.

4. An Access and Mobility Management Function (AMF) comprising:
   a controller; and a transceiver, wherein the controller is configured to:
   control the transceiver to transmit, to a Network Data Analytics Function (NWDAF), a request message for analytics for a load of a Session Management Function (SMF) which is different from the NWDAF; and
   control the transceiver to receive, from the NWDAF, a response message including load statistics information of the SMF corresponding to an analytics target period and validity information indicating a time period for which the load statistics information of the SMF is valid.

5. The method according to claim 1, wherein
the request message includes information indicating at least one network node subject to the analytics for the load.

6. The method according to claim 5, wherein
the at least one network node includes at least one of:
at least one network slice;
at least one Network Function (NF); and
at least one subnetwork.

\* \* \* \* \*